(12) United States Patent
Abrahamsen et al.

(10) Patent No.: US 11,022,367 B2
(45) Date of Patent: Jun. 1, 2021

(54) APPARATUS FOR EMPTYING AND FILLING HORIZONTAL FREEZERS AND FREEZING SYSTEM WITH APPARATUS FOR FILLING AND EMPTYING HORIZONTAL FREEZERS

(71) Applicant: OPTIMAR AS, Valderøy (NO)

(72) Inventors: Bengt Are Abrahamsen, Ellingsøy (NO); Bjørnar Andre Vik, Ålesund (NO); Erik Westre, Ålesund (NO); Vidar Pettersen, Ålesund (NO)

(73) Assignee: OPTIMAR AS, Valderoy (NO)

( * ) Notice: Subject to any disclaimer, the term of this patent is extended or adjusted under 35 U.S.C. 154(b) by 128 days.

(21) Appl. No.: 16/165,626

(22) Filed: Oct. 19, 2018

(65) Prior Publication Data

US 2019/0056171 A1 Feb. 21, 2019

Related U.S. Application Data

(63) Continuation of application No. PCT/NO2017/050097, filed on Apr. 19, 2017.

(30) Foreign Application Priority Data

Apr. 20, 2016 (NO) .................................. 20160654

(51) Int. Cl.
*F25D 25/04* (2006.01)
*F25D 31/00* (2006.01)
(Continued)

(52) U.S. Cl.
CPC ................ *F25D 25/04* (2013.01); *A23B 4/06* (2013.01); *B65G 47/74* (2013.01); *B65G 47/82* (2013.01);
(Continued)

(58) Field of Classification Search
CPC .......... F25B 13/20; F25B 13/22; F25B 13/18; A23B 4/06; B65G 47/74; B65G 47/82;
(Continued)

(56) References Cited

U.S. PATENT DOCUMENTS 5,038,916 A 8/1991 Quilliou
6,845,860 B1 1/2005 Walker
(Continued)

FOREIGN PATENT DOCUMENTS

DE 10103490 A1 8/2002
EP 1859977 A2 11/2007
(Continued)

OTHER PUBLICATIONS

Machine translation of JP2000318987 (Year: 2000).*
(Continued)

*Primary Examiner* — Joseph F Trpisovsky
(74) *Attorney, Agent, or Firm* — Robert P. Michal, Esq.; Carter, DeLuca & Farrell LLP (57) ABSTRACT

An apparatus for emptying and filling horizontal freezers, which includes a first and a second chain actuator, the chain actuators being arranged parallel to each other and parallel to an y axis, the chain actuators having first and second ends, a sliding beam arranged between the first and second chain actuators nearby, or at, the first end of the first and second chain actuators, and a feeding arrangement for retracting the first and second chain actuators from an extended configuration to a collapsed configuration and for extending the chain actuators from a collapsed configuration to an extended configuration.

15 Claims, 11 Drawing Sheets

(51) Int. Cl.
*B65G 47/82* (2006.01)
*A23B 4/06* (2006.01)
*B65G 47/74* (2006.01)

(52) U.S. Cl.
CPC ........ *F25D 31/001* (2013.01); *A23V 2002/00* (2013.01); *F25D 2325/00* (2013.01)

(58) Field of Classification Search
CPC ......... B65G 47/84; F16G 13/20; F16G 13/22; F16G 13/18
See application file for complete search history.

(56) References Cited

U.S. PATENT DOCUMENTS

| | | |
|---|---|---|
| 2006/0280587 A1 | 12/2006 | Guerra et al. |
| 2010/0108464 A1 | 5/2010 | Davi et al. |
| 2013/0205926 A1* | 8/2013 | Huang ..................... B66F 3/06 74/30 |

FOREIGN PATENT DOCUMENTS

| | | |
|---|---|---|
| JP | 2000318987 A | 11/2000 |
| WO | WO-2007020476 A1 | 2/2007 |

OTHER PUBLICATIONS

International Search Report issued by the European Patent Office acting as the International Searching Authority in relation to International Application No. PCT/NO2017/050097 dated Oct. 20, 2017 (3 pages).

Written Opinion of the International Searching Authority issued by the European Patent Office acting as the International Searching Authority in relation to International Application No. PCT/NO2017/050097 dated Oct. 20, 2017 (5 pages).

Norwegian Search Report issued by the Norwegian Patent Office in relation to Norwegian Application No. 20160654 dated Nov. 19, 2016 (2 pages).

* cited by examiner

APPARATUS FOR EMPTYING AND FILLING HORIZONTAL FREEZERS AND FREEZING SYSTEM WITH APPARATUS FOR FILLING AND EMPTYING HORIZONTAL FREEZERS

CROSS-REFERENCE TO RELATED APPLICATIONS

This application is a continuation of PCT International Application No. PCT/N02017/050097 filed on Apr. 19, 2017, which claims priority to Norwegian Patent Application No. 20160654, filed on Apr. 20, 2016, the disclosure of each of these applications is expressly incorporated herein by reference in their entirety.

TECHNICAL FIELD

The present invention generally relates to the emptying and filling of horizontal freezers, and more particularly to an apparatus for filling and emptying horizontal freezers and a freezing system comprising one or more apparatuses for emptying and filling horizontal freezers.

BACKGROUND ART

The present invention generally relates to the emptying and filling of horizontal freezers, and more particularly to an apparatus for filling and emptying horizontal freezers, a freezing system, and a method of emptying and filling horizontal freezers.

Horizontal freezers are used, for example, in the freezing of fish. The fish to be frozen needs to be transported to and from the horizontal freezers. The filling of horizontal freezers is often automated, whereas the full emptying of the horizontal freezers is usually performed manually. Manual emptying is accomplished in that contained items are pushed manually out by way of a rod, or, alternatively, metal boxes or wooden blocks may be used which are slid in between vertically adjacent freezing plates, thereby pushing the items out.

Figure 1:
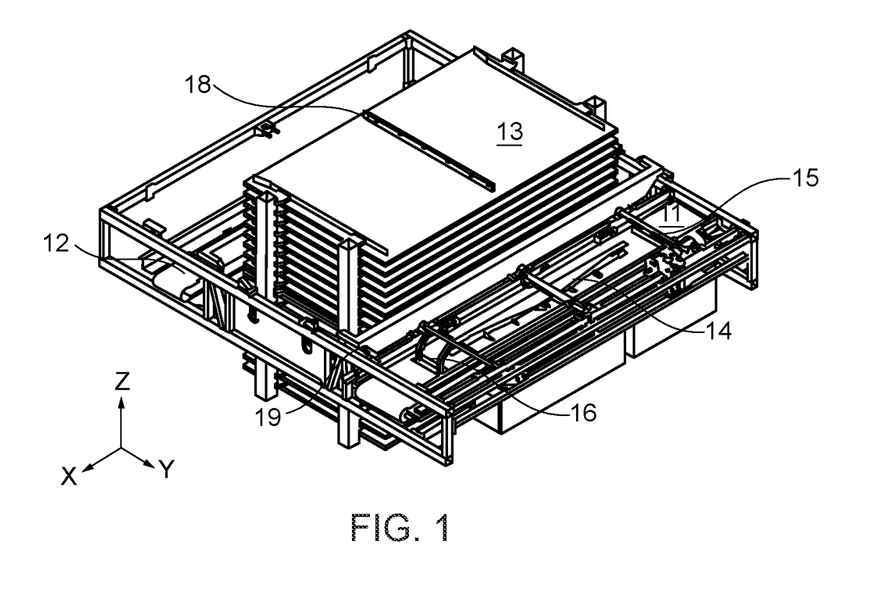
FIG. 1 shows a freezing system with a horizontal freezer and inlet and outlet conveyors.
Figure 2:
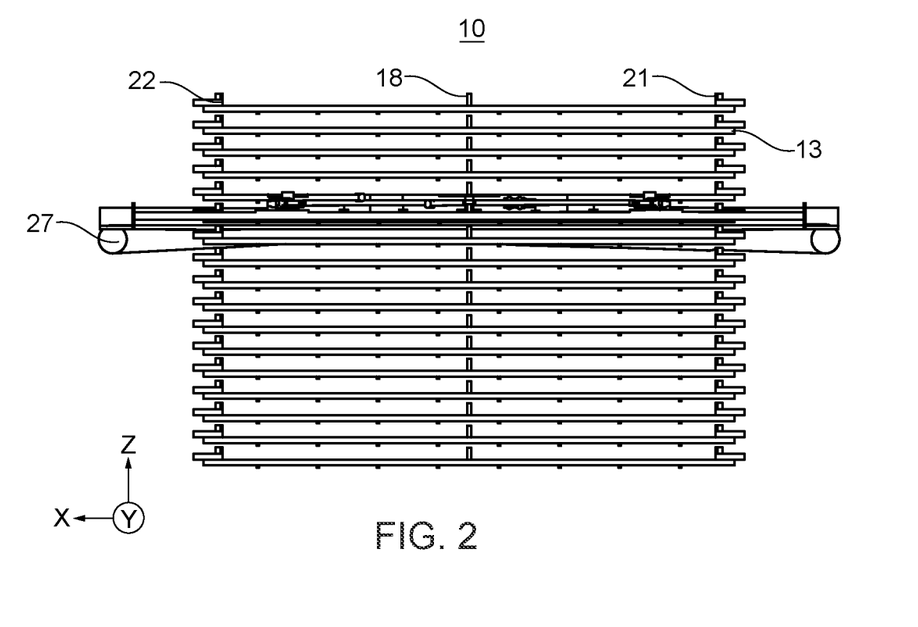
FIG. 2 shows a freezing system in a lateral view towards the conveyor for feeding the horizontal freezer.
Figure 3:
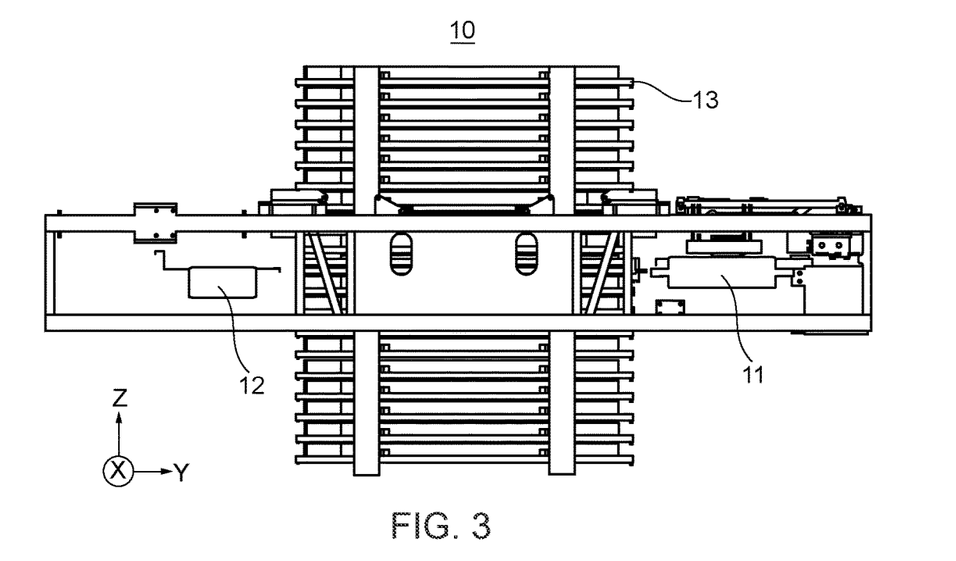
FIG. 3 shows a freezing system in a lateral view parallel to two conveyors.

In the following, a freezing system refers to a system including horizontal freezers, in which the fish is frozen, at least one transport system for carrying the fish to and from the horizontal freezers, and an apparatus for transferring fish between the freezing plates of the horizontal freezers and the conveyor. FIGS. 1 to 3 show exemplary fish freezing systems.

Hence, processed fish and fish that has not been processed are transported on conveyors to a horizontal freezer into which the fish is pushed in between freezing plates. The fish is frozen in blocks under pressure. After the fish is frozen, production workers can transfer the fish to the conveyor for transportation to packaging and/or freeze-storage.

SUMMARY OF THE INVENTION

According to the present invention, the above indicated problems are solved by providing an apparatus for filling and emptying horizontal freezers. Also provided are a freezing system and a method of filling and emptying horizontal freezers.

A problem experienced when freezing plates are to be completely emptied is that the freezing plates have a large depth and that consequently the pushing tool needs to have a correspondingly long travel length in order to be able to empty a freezing plate completely. The long travel length is inevitably very space consuming as the pushing tool, in a resting position—not doing any filling/emptying—will extend far away from the freezing plates, that is, in a −y direction (negative Y direction in the drawings).

The present invention has certain particular advantages, which will be briefly indicated in the bulleted items below:

- The chain actuators differ from other chain actuators in that they are adapted for horizontal use, with the chains being transversal to the direction of gravity, which is not usual for overhang pushing chains.
- The wear expected is avoided in such a lateral configuration in that there is no substantial internal movement between the links after it runs into the overhang and in that the chain wheel is positioned proximate to the projection of the overhang.
- An examination of the drawings shows that the chain wheel is positioned proximate to the projection of the overhang, which is advantageous because thereby, it becomes the breaking point at which the load on the chain is transferred to the wheel, and not to the weaker collapsed links.
- Overloading of lengthy chain stretches is avoided in that at the end of the overhang, where the sliding beam is located, support is provided by skis mounted to the sliding beam, which eventually strike the ground when it comes sufficiently far out.

According to the present invention, the intended effect is achieved by an apparatus for emptying and filling horizontal freezers, comprising:

a) a first and a second linear chain actuator, said chain actuators, in an extended configuration, being arranged parallel to each other and to an y axis,
  i. said chain actuators having first and second ends,
b) a sliding beam extending at least between said first and second chain actuators and being fixedly mounted nearby, or at, the first end of said first chain actuator and also being fixedly mounted nearby, or at, the first end of the first chain actuator and second chain actuator, and
c) a feeding arrangement for retracting said first and second chain actuators from an extended configuration to a collapsed configuration and for extending said chain actuators from a collapsed configuration to an extended configuration. The chain actuators are of a linear type, rigid chain actuators.

According to an aspect of the invention, the chain actuators are made up by a chain, whose chain links are only able to bend in one direction in a plane about a centre of rotation. In a variant, the chain actuators may be arranged with the front, or belly sides thereof opposing each other and with the sliding beam fixedly mounted nearby, or at, the first ends of the chain actuators. According to this variant, the chain actuators are fed synchronously to and from chain wheels, and the sections of the chain actuators located in a negative y direction relative to the chain wheels are directionally locked whereas the sections of the chain actuators located in a positive y direction of the chain wheels are able to bend towards each other in the xy plane.

In another variant of the invention, the chain actuators may be arranged with the back sides thereof opposite to each other and with the sliding beam fixedly mounted nearby, or at, the first end of the chain actuators. According to this variant, the first chain actuator is engaged with a first chain wheel and the second chain actuator is engaged with a second chain wheel, with the first and second chain wheels having their rotary shafts parallel to a z axis, so that the first and second chain actuators is able to be moved from the collapsed configuration to the extended configuration and from the extended configuration to the collapsed configuration with the sliding beam located in an xy plane and with the longitudinal direction of the sliding beam parallel to an x axis. The first and second chain wheels may include drive means providing for synchronous rotation of the first and second chain wheels.

In an aspect of the invention, the first chain wheel is driven by a first motor and the second chain wheel is driven by a second motor, with the first and second motors communicating with or including a motor controller providing synchronous operation of the motors.

In another aspect of the invention, the first and second chain wheels are driven synchronously by a motor, said single motor driving an endless belt, transmission, or chain rotationally engaged with the rotary shaft of the first and second chain wheels. The endless belt may be a V-belt, multi-ribbed belt, or toothed belt.

According to an aspect of the invention, the second ends of the first and second chain actuators are slidably arranged in a chain magazine or in separate chain magazines so that the chain actuators are able to switch between the extended and collapsed configurations, with the magazine having sufficient space for storing the first and second chain actuators in a collapsed configuration.

In still another aspect of the invention, said first and second chain actuators are associated with separate chain magazines, with the chain magazines being formed as plate-shaped bodies having separate paths embedded into the plate-shaped body so that said first and second chain actuators can run in separate embedded paths.

The path of the first chain actuator may have a length corresponding at least to the longitudinal displacement difference of the sliding beam between an outer, extended position and an inner, retracted position.

The above indicated problems are also solved by a freezing system comprising one or more horizontal freezers and further comprising:
a) one or more apparatuses for emptying and filling horizontal freezers, at least one of the apparatuses comprising:
   i. a first and a second chain actuator, said chain actuators, when in an extended configuration, being arranged parallel to each other in a y direction and to shelf plates of the horizontal freezers,
      1. said chain actuators having first and second ends,
   ii. a sliding beam extending at least between said first and second chain actuators nearby, or at, the first end of said first and second chain actuators, and
   iii. a feeding arrangement for retracting said first and second chain actuators from an extended configuration to a collapsed configuration and for extending the chain actuators from a collapsed configuration to an extended configuration.
b) two or more means of transportation provided in the form of at least one inlet conveyor and at least one outlet conveyor adjacent to the horizontal freezer,
c) a freezer zone including a stack of freezing plates.

According to an aspect of the freezing system, the sliding beam is provided with a cut-out being complementary to a first plate partition extending in the y direction on the freezing plates and being fixed to the freezing plates and arranged between and parallel to a second and a third plate partition arranged adjacent to the lateral edges of the freezing plates running in the y direction of the freezing plates.

According to an aspect of the invention, said at least one inlet conveyor and/or said at least one outlet conveyor is/are provided in the form of one of:
one or more endless belts, one or more chains, a combination of endless belts and rollers, or a combination of one or more chains and rollers.

In an aspect of the invention, at least one of said means of transportation is directly engaged with hoisting means for lifting and lowering said at least one means of transportation.

In another aspect of the invention, the stack of freezing plates is able to be lifted and lowered relative to at least one of said means of transportation. It is to be understood that independently of lifting and lowering means engaged with at least one conveyor, means for lifting and lowering the stack of freezing plates, or means for lowering and lifting freezing plates starting from a freezing plate to be filled or emptied, may also be included. When lowering freezing plates starting from a freezing plate to be emptied, then a neighbouring freezing plate located vertically above the freezing plate to be filled or emptied may be held in place by way of a retaining jaw, for example.

In an aspect of the invention, the shelf plates are stacked with a spacing along the z axis that is less than or substantially equal to the height of the sliding beam along the z axis to allow the sliding beam to be slid in and out between adjacent freezing plates for emptying content located on the freezing plates.

Further features and advantages will be apparent from the appended patent claims.

BRIEF DESCRIPTION OF THE DRAWINGS

The present invention will be readily understood by referring to the accompanying drawings, in which.

DETAILED DESCRIPTION OF THE INVENTION

The present invention will now be described in more detail with reference to the accompanying drawings.

In the following, it is to be understood that a conveyor refers to an endless belt such as a conveyor belt, with one or more chains or the conveyor possibly being provided with rotating rollers or a combination of rotating rollers and one or more endless belts. Further, the terms conveyor and means of transportation are used interchangeably, and unless explicitly indicated otherwise, the terms are to be understood to refer to a conveyor as defined above.

The present invention relates to an apparatus for emptying and filling horizontal freezers. Also disclosed is a freezing system including a horizontal freezer and apparatus for emptying and filling an horizontal freezer as well as associated means of transportation.

Exemplary freezing systems 10, 60 are shown in FIGS. 1-3 and 6-12, with FIGS. 6-12 showing freezing systems enabling automatic emptying of the horizontal freezer in accordance with the present invention.

It is seen from the drawings indicated that a freezing system 10, 60 comprises a horizontal freezer, which horizontal freezer, in turn, includes a stack of freezing plates. The freezing plates are spaced from each other by plate partitions 18, 21, 22. The plate partitions determine the distance between adjacent freezing plates. The plate partitions also will be decisive for the maximum allowable width of a frozen block. The drawings show three plate partitions 18, 21 22. However, additional plate partitions disposed between outer plate partitions 21, 22 located adjacent and parallel to the lateral edges of the freezing plates is conceivable.

To fill the horizontal freezers, the items, such as fish, need to be transported to the horizontal freezer or freezers. To this end, a conveyor is used. From the conveyor the items are slid in between freezing plates by a sliding beam. A proper height so that the correct freezing plate is filled is achieved either in that the shelf plate stack is able to be lifted and lowered or in that the conveyor is able to be lifted and lowered. It could also be entirely possible to provide a solution with which both freezing plates and one or each of the conveyors is/are able to be lifted and lowered. During filling or emptying of a freezing plate, it is conceivable that the plate to be filled or emptied is lowered somewhat together with the plates located underneath in the stack, whereas the freezing plate located above can be retained so that the distance between the freezing plate to be emptied and the adjacent overlying plate is slightly increased. The increased distance will facilitate the sliding in and out of items as the items therefore are not squeezed between the freezing plate to be emptied and the adjacent overlying plate.

Figure 4:
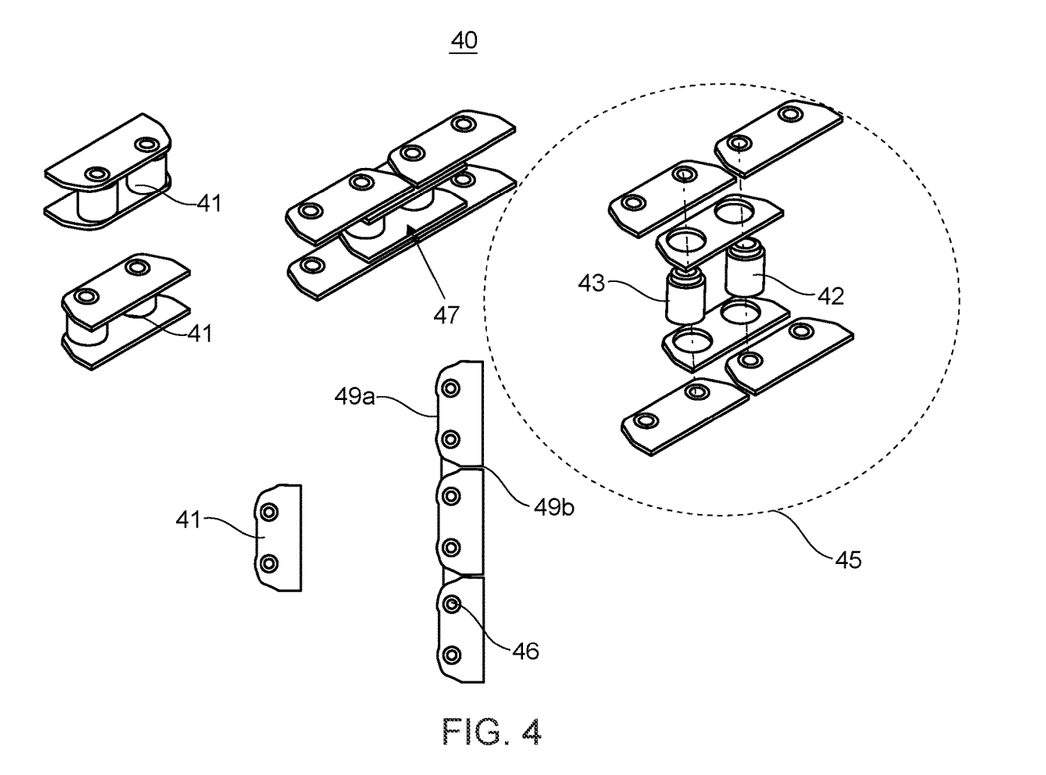
FIG. 4 shows an exemplary chain actuator chain link.

The sliding beam is moved transversely of the conveyor, that is, in the y direction (see the drawings), so that the items are slid in between two freezing plates. The movement of the sliding beam is accomplished by way of two chain actuators 51, 52, see FIGS. 5a and 5b. The chain actuators are made up by a special type of chain 40 whose chain links 41 are only able to bend in one direction about a centre of rotation 46. FIG. 4 shows a simplified assembly of an assembled chain link 47. The assembled chain link 47 includes a first and a second base plate each having two holes (see the exploded view of chain link 45). Arranged between the base plates is a connecting plate having two holes, of which the one hole is to be aligned with holes in the first base plate and the second hole is to be similarly aligned with a hole in the second base plate. Said base plates are similarly shaped. A chain pin 42 is mounted in one of the holes formed by the first base plate and the connecting plate, whereas the second chain pin 43 is mounted in the other one of the holes in the connecting plate formed by the second base plate and the connecting plate. A corresponding solution is used for two top plates having an intermediate connecting plate. In FIG. 4, the base and top plates are shown with rounded corners on one side, which is the normal case for chains in order to allow the chain to bend. However, on the other side of the top and base plates, a back 49b is straight and parts of the plates defines a straight edge 49b. In this manner, when several assembled chain links 47 are connected, a chain 40 is obtained which is able to bend in one direction, herein shown towards a belly 49a, whereas the chain is rigid and unable to bend towards back 49b.

Figure 5A:
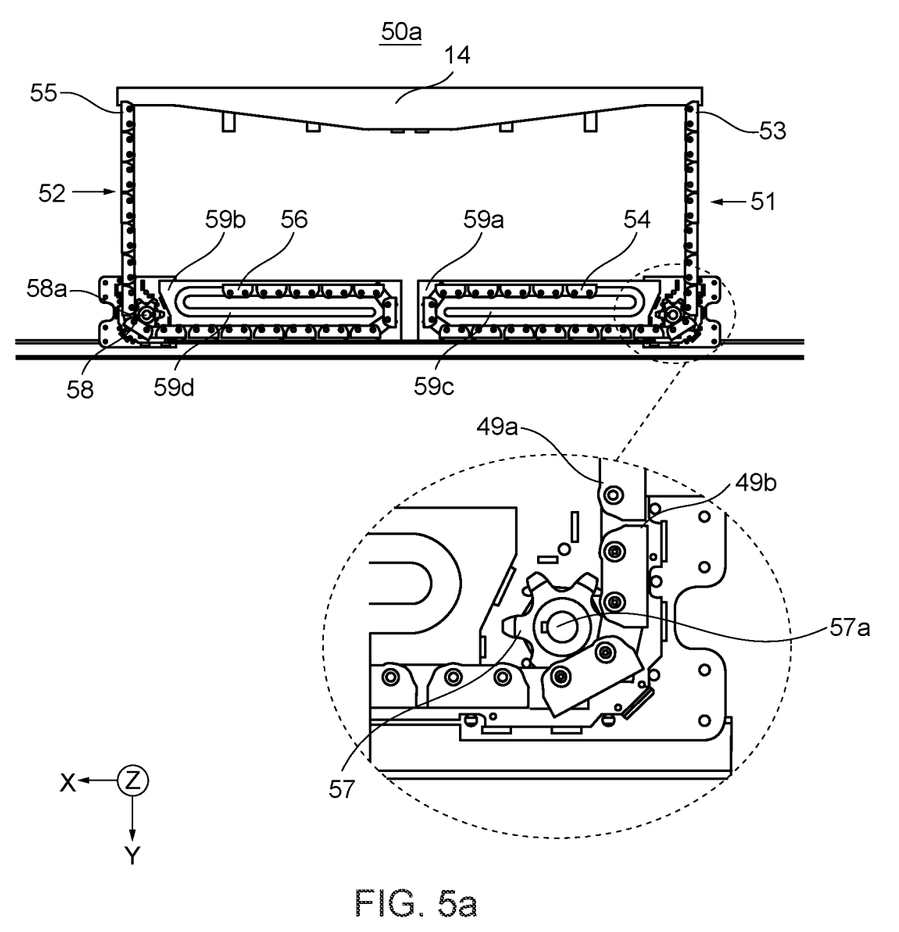
FIG. 5a shows an apparatus having chain actuators for filling and emptying horizontal freezers.
Figure 5B:
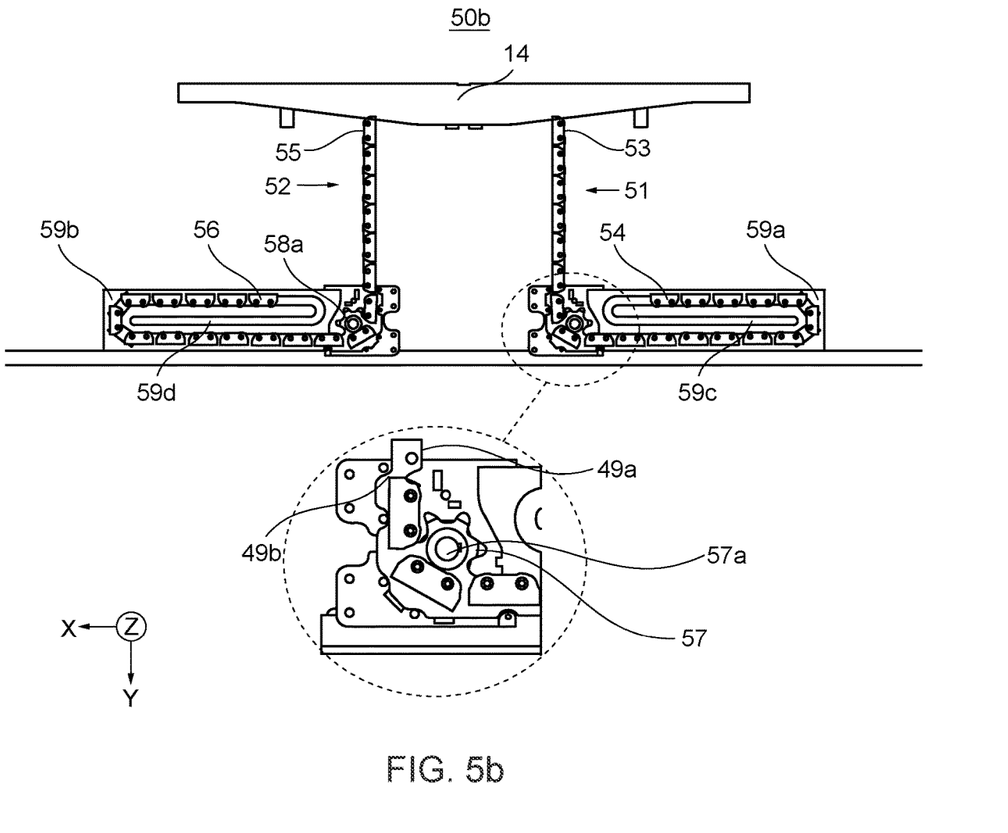
FIG. 5b shows an apparatus having chain actuators for filling and emptying horizontal freezers.

FIGS. 5a and 5b show the apparatus 50a, 50b which, in accordance with the present invention, is used for filling and emptying horizontal freezers. By arranging two chains 51, 52 with the bellies opposing each other (see FIG. 5a) and having a sliding beam 14 arranged at or proximate to the ends 53, 55 of chains 51, 52, it is ensured that sliding beam 14 will only be able to move in a y direction, see FIGS. 6-12. At the second end of the chains a "feeding arrangement" able to pull and push the two adjacent chains 51, 52 in and out is arranged. The chains are located in the same plane parallel to the shelves of the horizontal freezers able to be emptied or filled by the chain actuators. The feeding and pulling function of the chain actuators may be provided, for example, through the use of two gear/chain wheels 57, 58, each gear wheel being capable of being engaged with one of chains 51, 52. Chains 51, 52 may be stored in separate magazines 59a, 59b or may share a common magazine when sliding beam 14 is in the retracted state. The horizontal freezer will be emptied if the sliding beam moves sufficiently far in the y direction for the frozen items to be transferred to a conveyor 12 for transporting the items away from the freezing system.

It is to be understood that the apparatus 50a for emptying horizontal freezers may also be implemented by having the backs of the chain actuators face each other, as can be seen in FIG. 5b. The apparatus 50b functions in the same manner as the apparatus in which the bellies of the chains face each other.

An Embodiment of an Apparatus for Emptying and Filling Horizontal Freezers

FIG. 5a shows an embodiment of an apparatus for filling and emptying horizontal freezers according to the present invention. The apparatus includes a first 51 and a second 52 chain actuator, with chain actuators 51, 52 being made up by a chain 40 which is only able to bend in one direction. In FIG. 5a this is shown in that first chain actuator 51 is only able to bend in the x direction whereas the second chain actuator is only able to bend in the −x direction (negative x direction). The first chain actuator has a first end 53 and a second end 54, the second chain actuator 52 has a first end 55 and a second end 56, with the first end 53 of first chain actuator 51 being attached to a sliding beam 14 and the first end 55 of second chain actuator 52 being attached to sliding beam 14 at a distance g from first chain actuator 51. Sliding beam 14 has its longitudinal axis coincident with the x direction. With a geometrical solution like this, the chain actuators will be "rigid" in the extended configuration. This can be explained in that when first chain actuator 51 is subject to "bending forces» in the x direction against its belly side 49a, then the chain will not bend because the forces are transferred via sliding beam 14 to second chain actuator 52, which second chain actuator 52 are unable to bend towards the back 49b, so the assembly constituted by sliding beam 14 and chain actuators 51, 52 forms a rigid structure suited for pushing and pulling the sliding beam in and out between freezing plates. If forces are applied to second chain actuator 52 in the opposite direction, then first chain actuator 51, via sliding beam 14, will accommodate the forces in a similar manner to make sure chains 40 don't bend.

Apparatus 50a for emptying and filling horizontal freezers further includes at least one chain magazine adapted for storing chain actuators 51, 52. The solution with chains 51 and 52 able to bend about the Z axis in the x direction allows the chain magazine to be located in a lying position, that is, parallel to the XY plane. The first 51 and second 52 chain actuators may be associated with separate chain magazines 59a, 59b, with the chain magazines 59a, 59b being formed as plate-shaped bodies having separate paths 59c, 59d being embedded into the plate-shaped body so that the first 51 and second 52 chain actuators can run along separate embedded paths 59c, 59d. The length of the paths depends on the desired travel length l of chain actuators 51, 52. The travel length l may at least correspond to the distance from a chain feeding arrangement to the lateral edge of the freezer plates located the furthest from conveyor 11 for filling the horizontal freezers.

Movement of sliding beam 14 in the x direction is accomplished by feeding the first 51 and second 52 chain actuators synchronously out or in by means of feeding arrangements. The feeding arrangements may be formed by two separate chain wheels 57, 58 adapted for engagement with the two chain actuators 51, 52. The directional locking of the chain ends at this point because the section of the chain that has travelled past chain wheels 57, 58 is disengaged. Chain wheels 57, 58 are rotated about axes of rotation 57a, 58a, which axes of rotation extend along a z direction, so that the chain actuators can be moved in the y direction. The chain wheels, in turn, are driven by drive means. The first 51 and second 52 chain actuators, in the collapsed configuration, will have a substantial part of chains 40 thereof stored in magazines 59a, 59b. Upon actuation of chain wheels 57, 58, that is, rotation in an anti-clockwise direction in case of first chain wheel 57 and rotation in a clockwise direction in case of second chain wheel 58, chain actuators 51, 52 will be pulled out of their paths 59c, 59d in magazines 59a, 59b and push sliding beam 14 in the y direction. Movement of the sliding beam to a retracted position is accomplished in the opposite manner, that is, the chain wheels are rotated in opposite directions.

In order to prevent chains 40 from being fed completely out of their magazines 59a, 59b, said drive means 81, 82 driving the chain wheels need to be able to stop at the right point. A stopping function may be provided, for example, in that a sensor is arranged in paths 59c, 59d of chains 40. The sensor of the first chain actuator 51 may be arranged proximate to first chain wheel 57 adjacent to path 59c in magazine 59a. A similar stopping function may be provided for the second chain actuator 52. It would also be possible to include a spring loaded mechanical switch that is operated when a chain end 54, 56 passes by it, so that the power to the driving means or to a relay controlling the drive means is cut. Stoppage of the motor of drive means 81, 82 when sliding beam 14 is run to the retracted position may be provided for, for example, by detecting the position of the sliding beam, by way of a mechanical switch, inductive transmitter, light, or some kind of «proximity detector,» which is known to a person skilled in the relevant art.

It is essential that chain actuators 51, 52 are driven synchronously in and out of the magazine so that the longitudinal axis of sliding beam 14 extends in the X direction, or substantially in the X direction. The synchronous movement of chain wheels 57, 58 may be achieved in several ways. Drive means 81, 82 of the chain wheels may be obtained from a motor having a toothed belt pulley, toothed wheel, or the like engaged with an endless belt driving similar toothed belt pulleys, toothed wheels, or the like of shafts 57a, 58a of the chain wheels, providing a synchronous movement. A motor with transmission to said two chain wheel axles may be provided in several manners. The endless belt may be a toothed belt, V-belt, chain, or multi-ribbed belt. Skidding belts may present a challenge to the synchronous operation of chain wheels 57, 58. Alternatively, each chain wheel could be connected directly to a separate drive means 81, 82, or via a transmission. Synchronism is then achieved in that drive means 81, 82 are controlled from a common controller.

Figure 13:
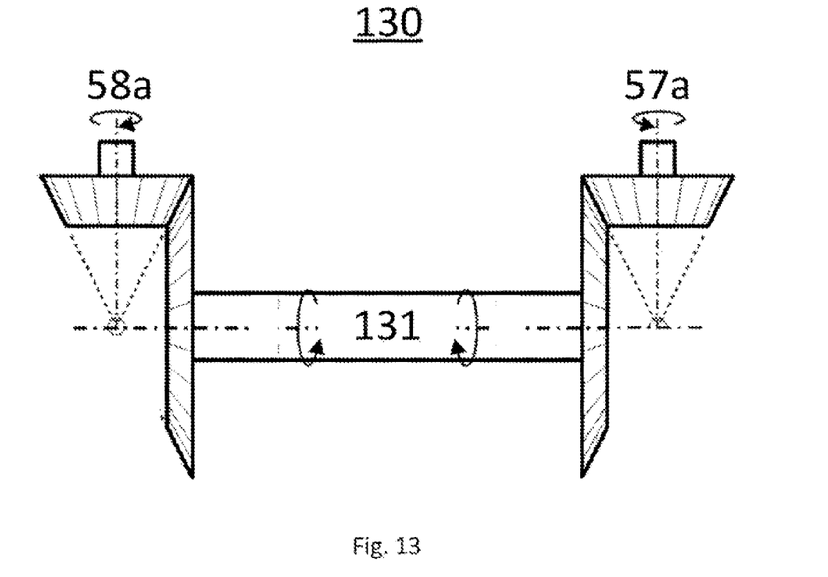
FIG. 13 shows a synchronous chain wheel drive system.
Figure 14:
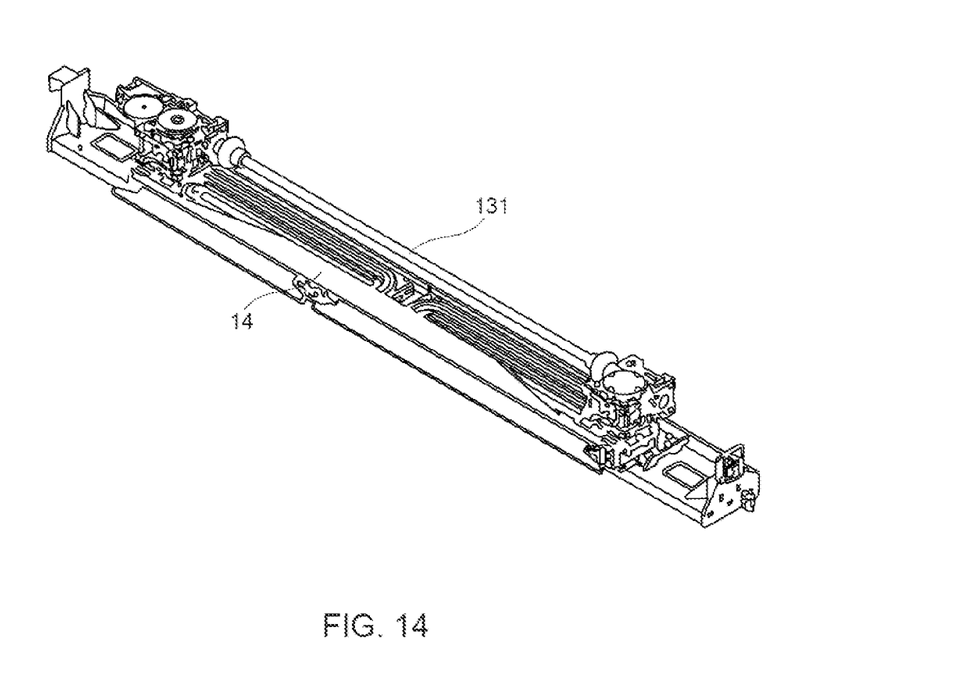
FIG. 14 shows a synchronous chain wheel drive system together with the sliding beam and chain actuator.

A simple solution 130 may be provided by to angular gears connected via a shaft 131. The shaft may be fitted with a crown gear at the ends thereof being engaged with pinions able to drive the chain wheels (see FIGS. 13-14).

A Second Embodiment of an Apparatus for Emptying and Filling Horizontal Freezers FIG. 5b shows an embodiment of an apparatus for filling and emptying horizontal freezers according to the present invention. The apparatus includes a first 51 and a second 52 chain actuator, with chain actuators 51, 52 being made up by a chain 40 which is only able to bend in one direction. In FIG. 5b this is shown in that first chain actuator 51 is only able to bend in the −x direction (negative x direction) whereas the second chain actuator is only able to bend in the x direction, that is, the opposite solution to that disclosed in the embodiment of FIG. 5a. Hence, in FIG. 5b chains 51 and 52 are arranged back to back whereas in 5a, the chains are arranged belly to belly.

The remaining features of the second embodiment of an apparatus for emptying and filling horizontal freezers are otherwise similar to those disclosed in the embodiment of FIG. 5a. An examination of FIG. 5b, in conjunction with the discussion of the embodiment shown in FIG. 5a, will provide an understanding of the mode of operation of the second embodiment.

An Embodiment of a Freezing System

Figure 6:
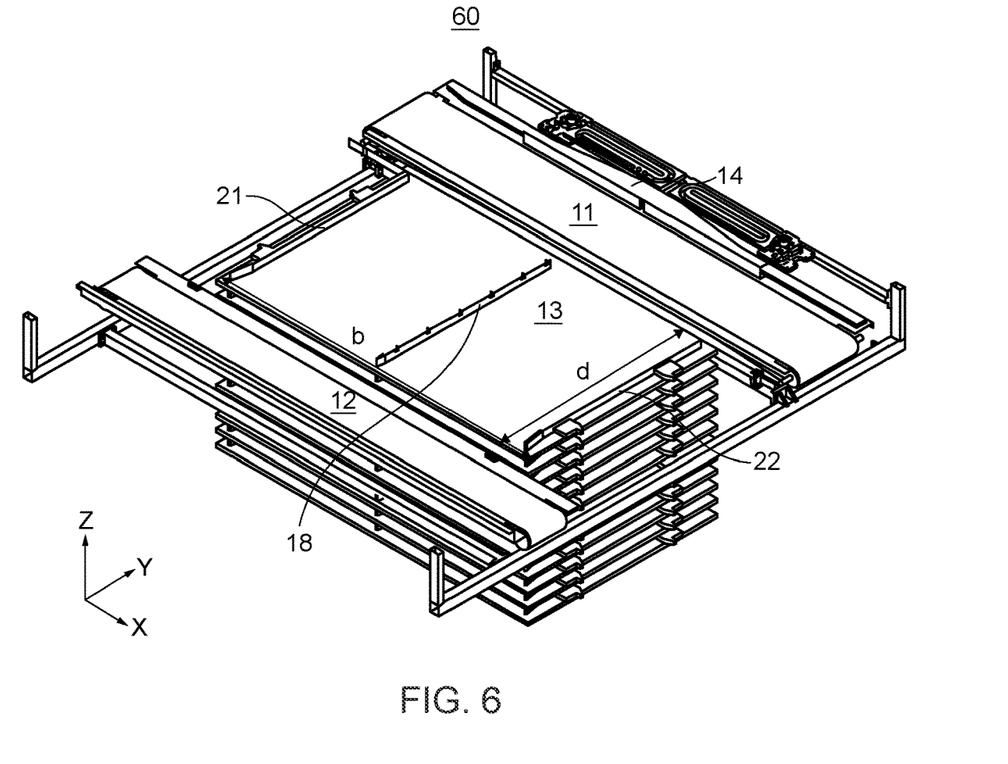
FIG. 6 shows a freezing system including apparatus for emptying and filling horizontal freezers, with the sliding beam shown in a retracted position.
Figure 7:
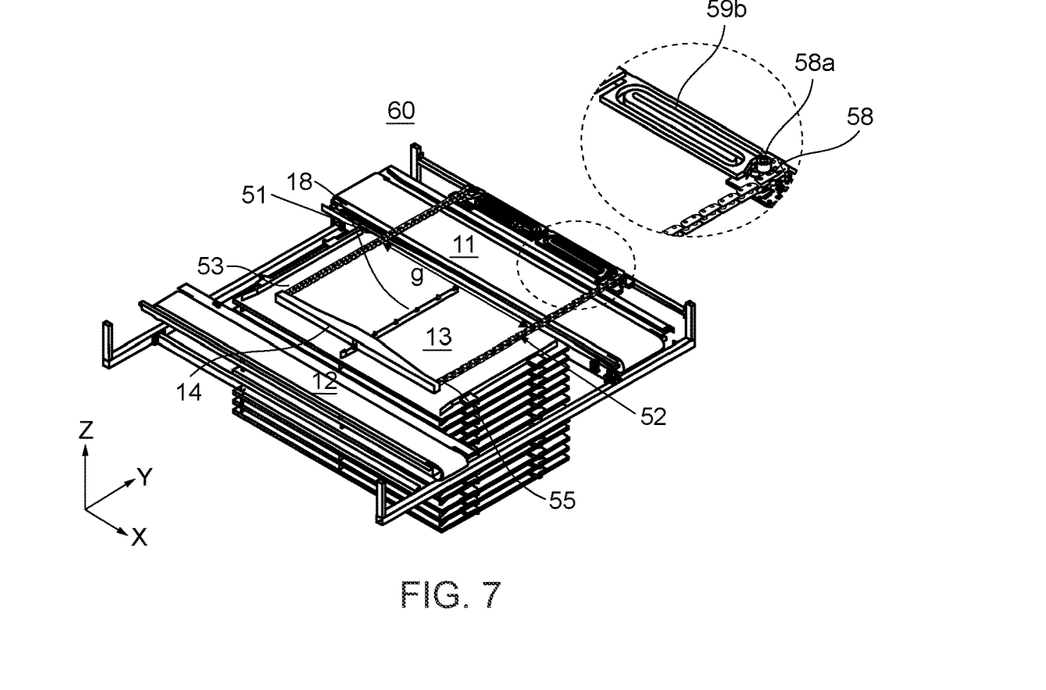
FIG. 7 shows a freezing system including apparatus for emptying and filling horizontal freezers, with the sliding beam shown in an extended position, with the figure also showing an exploded view of a magazine for storing the chain actuator.
Figure 8:
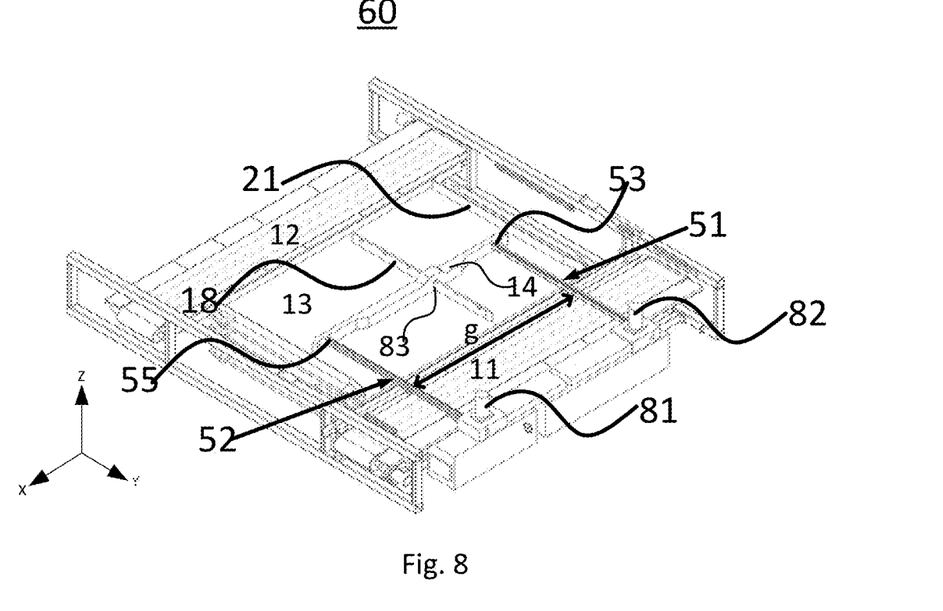
FIG. 8 shows a freezing system including apparatus for emptying and filling horizontal freezers, with the sliding beam shown in a partially extended position.
Figure 9:
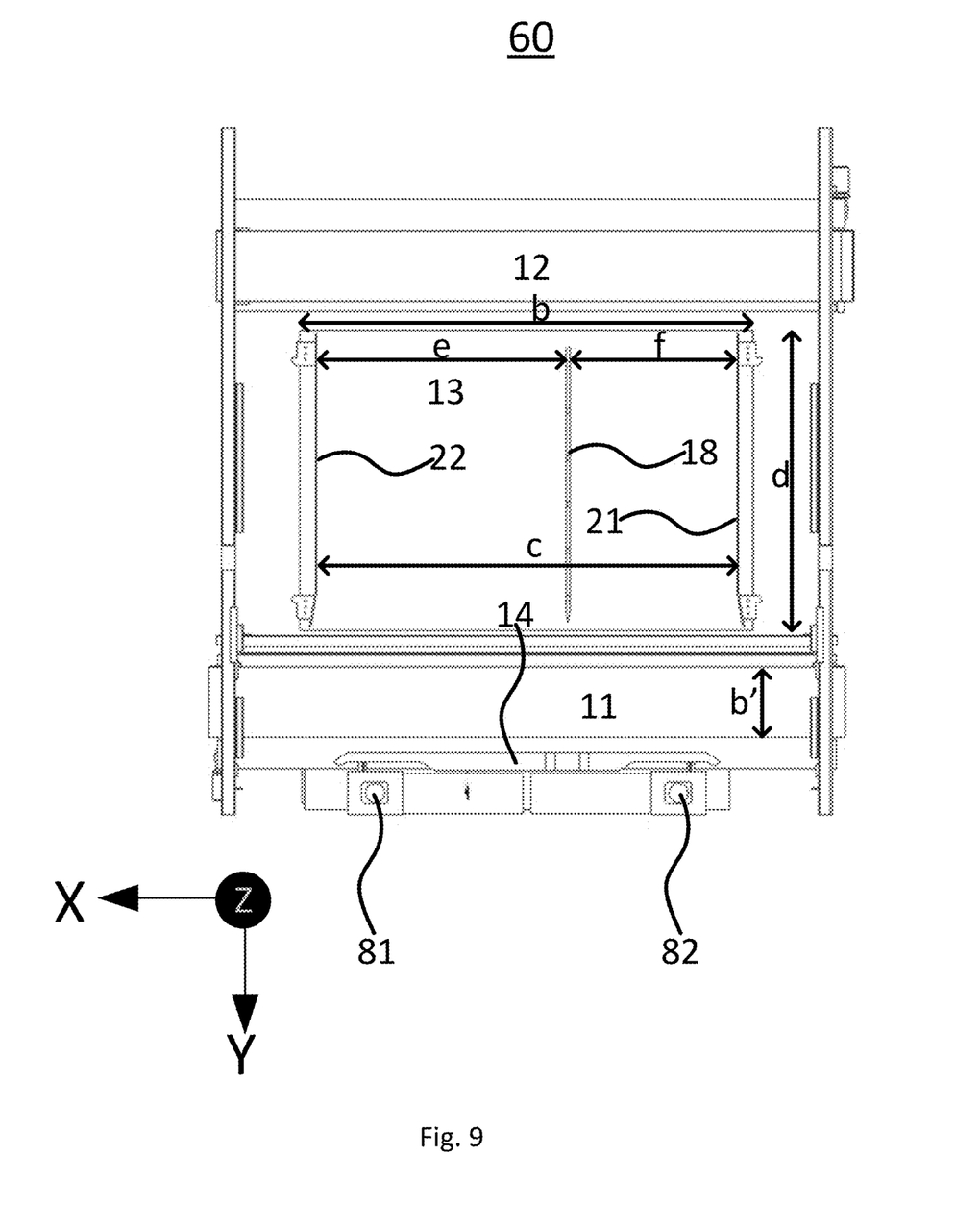
FIG. 9 shows a freezing system including apparatus for emptying and filling horizontal freezers, with the sliding beam shown in a retracted position, in a top view.
Figure 10:
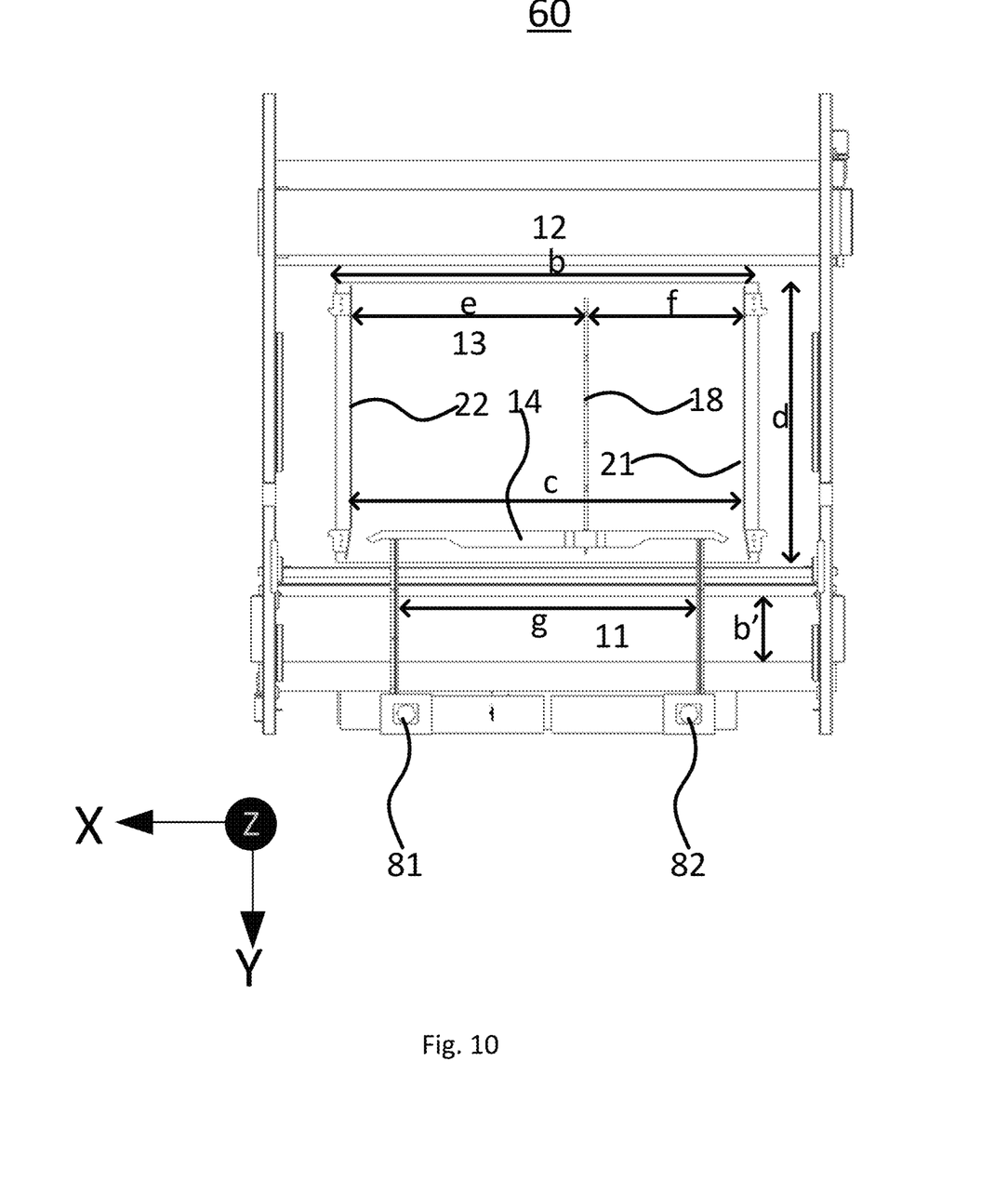
FIG. 10 shows a freezing system including apparatus for emptying and filling horizontal freezers, with the sliding beam shown in a partially extended position, in a top view.
Figure 11:
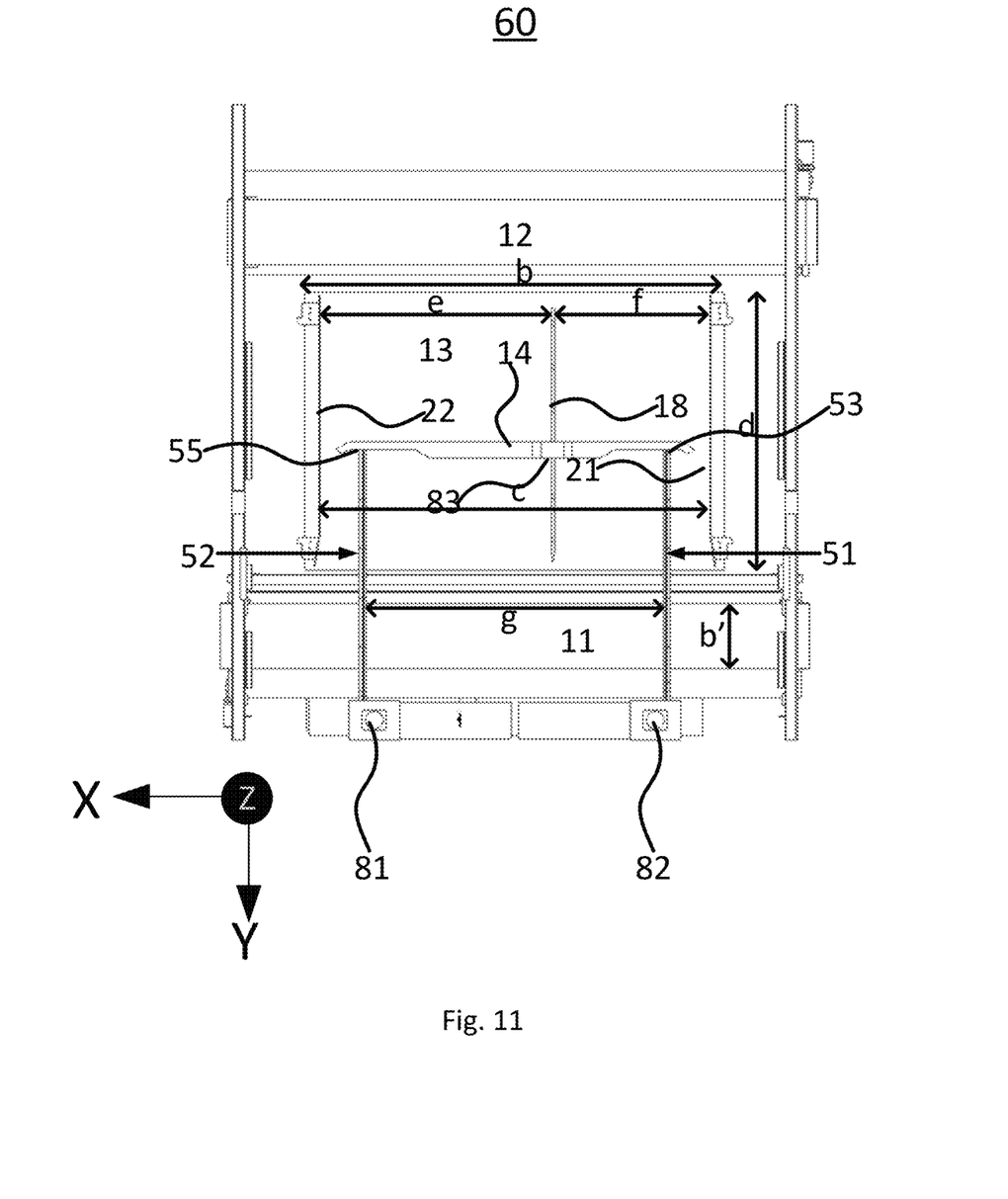
FIG. 11 shows a freezing system including apparatus for emptying and filling horizontal freezers, with the sliding beam shown in a partially extended position, in a top view.

The invention also relates to a freezing system including a horizontal freezer and an apparatus for filling and emptying horizontal freezers. FIG. 6 shows a freezing system according to an embodiment of the invention in a perspective view. It is apparent from the figure that at least one freezing plate above the upper plate shown in the stack has been «removed» for illustrative purposes. Thus, the freezing plate stack may be higher in the vertical direction, i.e. the Z direction. FIGS. 7-12 show a similar freezing system. The freezing system includes one or more stacks of freezing plates. In FIGS. 6-12 a simple system is shown with one stack of freezing plates 13. Each freezing plate has a length b in the x direction and a depth d in the y direction. The distance between two adjacent freezing plates 22 is given the height of plate partitions 18, 21, 22, which protrude upwardly, in the z direction, from freezing plates 13. In FIGS. 6-12, the freezing plates are provided with three plate partitions 18, 21, 22. A first plate partition 21 extends along a first side of a freezing plate in the y direction and a second plate partition 22 extends along a second side of a freezing plate in the y direction opposite to first plate partition 21, at a distance c therefrom. An intermediate plate partition 18 is shown arranged with its longitudinal direction in the y direction. The intermediate plate partition is located at a distance f from first plate partition 21 and at a distance e from second plate partition 22. The distances e and f may be equal or different. Plate partitions 18, 21, 22 have a length d that approximately equals the depth d of the freezing plates. In order for sliding beam 14 to be able to move inwardly on freezing plates 13, the sliding beam must be provided with a gap adapted to the height and width of intermediate plate partition 18.

Items to be frozen will, as a frozen block, have a maximum size dictated by the sizes e and f and of the depth d. The height in the z direction is dictated in part by the height of the plate partitions, but since the frozen blocks are normally frozen under pressure from the freezing plates surrounding the frozen block, the frozen block may have a height in the z direction that is somewhat larger than the height of the plate partitions in the z direction. Of course, a frozen block may be significantly smaller than the restrictions imposed by e, f, and d.

The feeding of items into the horizontal freezer is accomplished by using chain actuators 51, 52 combined with a sliding beam of an apparatus 50a, 50b for filling and emptying horizontal freezers according to the present invention as described above.

The freezing system further includes conveyors 11 and 12 for carrying items to and from the horizontal freezer(s). In FIGS. 6-12, the conveyors are shown as endless transmission belts. Inlet conveyor 11 and outlet conveyor 12 may be embodied as one of the following: one or more endless belts, one or more chains, a combination of endless belts and rollers, or a combination of one or more chains and rollers.

In an embodiment of the invention, at least one of the conveyors is directly engaged with hoisting means for lifting and lowering the at least one conveyor. In another embodiment of the invention, the entire stack of freezing plates may be lifted and lowered and/or only parts of the stack may be lifted and lowered. However, it is essential that the conveyor and a freezing plate to be filled are located at about the same horizontal level, the xy plane.

Figure 12:
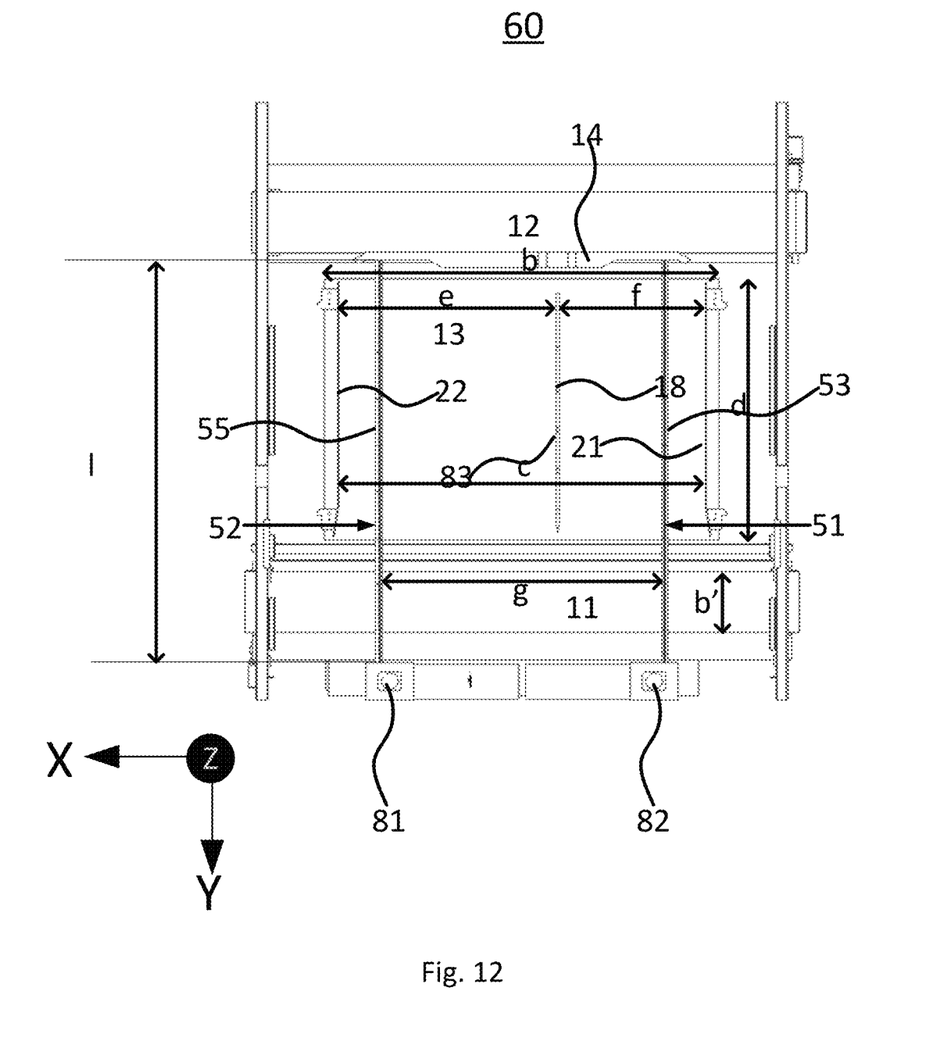
FIG. 12 shows a freezing system including apparatus for emptying and filling horizontal freezers, with the sliding beam shown in an extended position, in a top view.

FIGS. 9 to 12 show exemplary sliding beams 14 in the retracted position (FIG. 9) and at a maximum travel length l (FIG. 12).

FIGS. 1 and 3 show stopper devices 15, 16 which purpose is to prevent items on the inlet conveyor 11 from falling off the belt in the direction of travel of the belt.

In the foregoing, the present invention has been described with reference to the drawings and to the embodiments shown in the drawings.

As indicated, items on the inlet conveyor must be prevented from falling off the belt in the direction of travel. According to prior art, the freezing system can be provided with stopper devices 15, 16, but the belt may also be controlled in such a manner that it stops when the items on the belt is properly positioned for being entered into the horizontal freezer. According to the present invention, conveyor 11 can also be provided with carrying pins that carry with them items at a particular distance determined by the distance between the neighbouring carrier pins.

In the drawings, the horizontal freezer is shown to include a stack of freezing plates, of which each freezing plate is provided with three plate partitions 18, 21, 22. Each freezing plate may be provided with more plate partitions, provided that sliding beam 14 is provided with more openings 83. Alternatively, several apparatuses for emptying horizontal freezers arranged adjacent to each other in the x direction and situated in the same horizontal plane may be used, so that freezing plates of a large length b can be emptied, or freezing plates having a large number of plate partitions can be emptied without the sliding beams being provided with openings 83. In a solution including a series of apparatuses along a same conveyor, the freezers can be filled and emptied in parallel and asynchronously or synchronously.

| | |
|---|---|
| 10 | Freezing system including a horizontal freezer having freezing plates 13 provided with partitions 18, 21, 22, a sliding beam 14, and conveyors 11 and 12. |
| 11 | An inlet conveyor in the form of a belt conveyor |
| 12 | An outlet conveyor in the form of a belt conveyor |
| 13 | Freezing plates |
| 14 | Sliding beam |
| 15 | A first stopper for collecting items |
| 16 | A second stopper for collecting items |
| 18 | First plate partition in the y direction fixed to freezing plates 13 |
| 19 | Retaining jaw, a device which, when engaged, keeps the upper edge of the freezing plate stack at a fixed height relative to the conveyors while the lower edge of the freezing plate stack is lowered (by the lowering mechanism at the bottom) until the gap between the freezing plates above and below the conveyor is sufficient to enable the sliding beam to insert items from the conveyor unhindered. |
| 21 | Second plate partition in the y direction fixed to freezing plates 13 and adjacent to a lateral edge of freezing plate 13 |
| 22 | Third plate partition in the y direction fixed to freezing plates 13 and adjacent to a lateral edge of freezing plate 13. |
| 27 | Roller of a belt conveyor. |
| 40 | Chain |
| 41 | Single chain link |
| 42 | First chain pin |
| 43 | Second chain pin |
| 45 | Exploded chain link |
| 46 | Centre of rotation of chain link |
| 47 | Assembled chain link |
| 49a | "Belly" of chain 40 |
| 49b | Rotation-preventing back of the chain |
| 50a | Apparatus for emptying horizontal freezers including a chain actuator |
| 50b | Apparatus for emptying horizontal freezers including a chain actuator |
| 51 | First chain actuator |
| 52 | Second chain actuator |
| 53 | First end of the first chain actuator |
| 54 | Second end of the first chain actuator |
| 55 | First end of the second chain actuator |
| 56 | Second end of the second chain actuator |
| 57 | A first chain wheel |
| 57a | Axis of rotation of the first chain wheel |
| 58 | A second chain wheel |
| 58a | Axis of rotation of the second chain wheel |
| 59a | A first magazine of the first chain actuator |
| 59b | A second magazine of the second chain actuator |
| 59d | A first path in a first magazine of the first chain actuator |
| 59d | A second path in a second magazine of the second chain actuator |
| 60 | Freezing system including a horizontal freezer with freezing plates 13 provided with partitions 18, 21, 22, a sliding beam 14, and conveyors 11 and 12 and chain actuators 51, 52 for filling and emptying the horizontal freezer |
| 81 | Drive means of the second chain actuator |
| 82 | Drive means of the first chain actuator |
| 83 | Grooves in the sliding beam being complementary to the first plate partition 18 |
| 130 | Angular gear arrangement for the synchronous operation of chain |

| | |
|---|---|
| | wheel 58 |
| 131 | Shaft provided with a crown wheel |
| b | Width of the freezing plates in the x direction |
| b' | Width of a conveyor for filling horizontal freezers. |
| d | Depth of a horizontal freezer in the y direction |
| c | Distance between second 21 and third plate partition 22 |
| G | Distance between the first and second chain actuators in the extended configuration in the X direction |
| I | Travel length of the chain actuator in a fully extended configuration (y direction) |

The invention claimed is:

1. An apparatus for emptying and filling horizontal freezers, comprising:
   a) a first and a second linear chain actuator, said chain actuators comprising assembled chain links, and said chain actuators, in an extended configuration, being arranged parallel to each other and parallel to an y axis,
      i. said first chain actuator having a first end and a second end,
      ii. said second chain actuator having a first end and a second end,
   b) a sliding beam extending at least between said first and second chain actuators and being fixedly mounted nearby, or at, the first end of the first chain actuator, and also being fixedly mounted nearby, or at the first end of the second chain actuator,
   c) a feeding arrangement for retracting said first and second chain actuators from an extended configuration to a collapsed configuration and for extending said chain actuators from a collapsed configuration to an extended configuration, and
   d) the first chain actuator is engaged with a first chain wheel and the second chain actuator is engaged with a second chain wheel, wherein said first and second chain wheels having their axes of rotation parallel to a z axis, so that said first and second chain actuators can be driven from the collapsed configuration in a horizontal XY-plane to the extended configuration in the XY-plane and the first chain actuator and the second chain actuator are arranged in a mutual belly to belly configuration and said first and second chain actuators are configured to be driven from the extended configuration in the horizontal XY-plane to the collapsed configuration in the horizontal XY-plane with the sliding beam in the horizontal XY-plane and with the longitudinal direction of the sliding beam parallel to an x axis.

2. The apparatus of claim 1, wherein the chain actuators are made up by a chain whose chain links are only able to bend in one direction in the horizontal XY-plane about a center of rotation.

3. The apparatus of claim 1, wherein the assembled chain links comprise a first and a second base plate each having two holes, a connecting plate having two holes, of which one hole is to be aligned with a hole in said first base plate and the other hole is to be similarly aligned with a hole in said second base plate, being arranged between said base plates, said base plates being of similar shapes, and a chain pin being arranged in one of the holes formed by said first base plate and said connecting plate and a second chain pin being arranged in the other one of the holes in said connecting plate formed by said second base plate and said connecting plate.

4. The apparatus of claim 1, wherein the sliding beam is fixedly mounted nearby or at the first ends of said chain actuators and support is provided by skis mounted to the sliding beam.

5. The apparatus of claim 4, wherein the chain actuators are fed synchronously in and out of the chain wheels and wherein the sections of said chain actuators located in the negative y-direction of the chain wheels is directionally locked, whereas the sections of said chain actuators located in a positive y-direction of said chain wheels are able to bend towards each other in the horizontal XY-plane.

6. The apparatus of claim 1, wherein the first and second chain wheels include drive means providing for a synchronous rotation of said first and second chain wheels.

7. The apparatus of claim 6, wherein the first chain wheel is driven by a first motor and the second chain wheel is driven by a second motor, the first and the second motors being in communication with or including a motor controller providing for synchronous operation of the motors.

8. The apparatus of claim 5, wherein the first and second chain wheels are driven synchronously by a single motor, the single motor driving an endless belt, a transmission, or a chain being rotationally engaged with the rotary shaft of the first and second chain wheels.

9. The apparatus of claim 8, wherein the endless belt is a V-belt, multi-ribbed belt or toothed belt.

10. The apparatus of claim 7, wherein the drive means are provided by two angular gears connected via a shaft, the shaft including two identical crown wheels engaged with separate pinions able to drive the chain wheels, and the shaft being rotated by the drive means.

11. The apparatus of claim 1, wherein the second ends of the first and second chain actuators are slidably arranged in a chain magazine or separate chain magazines so that said chain actuators are able to switch between the extended and collapsed configurations, the magazine having sufficient space for storing said first and second chain actuators in a collapsed configuration.

12. The apparatus of claim 11, wherein said first and second chain actuators are associated with separate chain magazines and wherein the chain magazines are formed as plate-shaped bodies having separate paths embedded in the plate-shaped body so that said first and second chain actuators are able to run in separate embedded paths.

13. The apparatus of claim 12, wherein the path of the first chain actuator has a length which at least corresponds to the difference in longitudinal displacement of the sliding beam between an outer, extended position and an inner, retracted position.

14. The apparatus of claim 1, wherein the chain wheels are positioned proximate to the projection of an overhang.

15. The apparatus of claim 1, wherein the first and second linear chain actuators and the sliding beam are coplanar.

* * * * *